Feb. 15, 1944.    J. P. BAGAN    2,342,031
LAND CULTIVATING APPARATUS
Filed May 28, 1941    3 Sheets-Sheet 1

INVENTOR
JOHN PETER BAGAN
BY
ATTORNEY

Feb. 15, 1944.    J. P. BAGAN    2,342,031
LAND CULTIVATING APPARATUS
Filed May 28, 1941    3 Sheets-Sheet 2
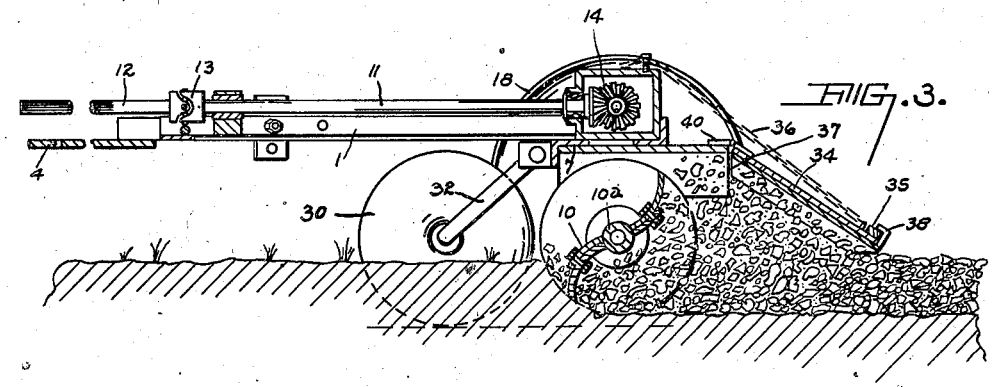
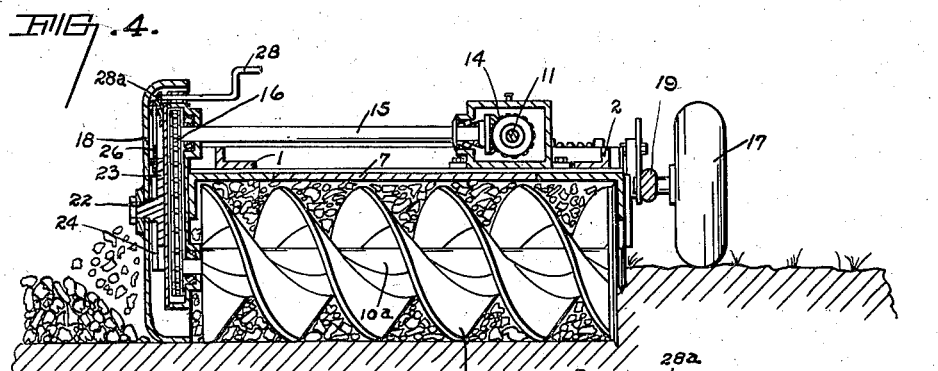
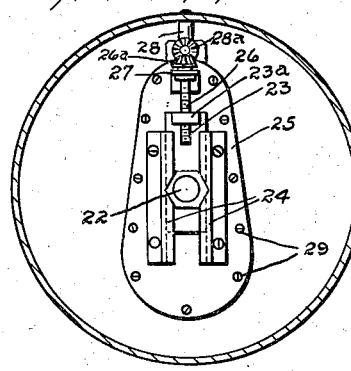
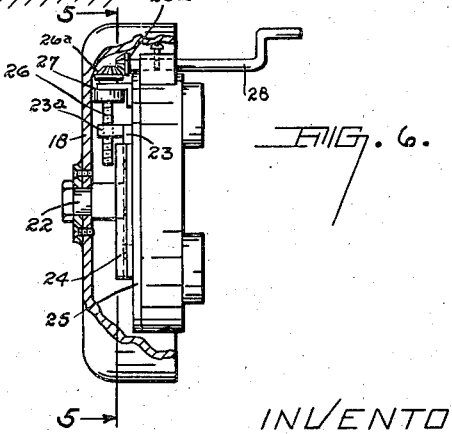
INVENTOR
JOHN PETER BAGAN
BY
ATTORNEY Feb. 15, 1944.　　　J. P. BAGAN　　　2,342,031
LAND CULTIVATING APPARATUS
Filed May 28, 1941　　　3 Sheets-Sheet 3

INVENTOR
JOHN PETER BAGAN
BY
ATTORNEY

Patented Feb. 15, 1944

2,342,031

UNITED STATES PATENT OFFICE 2,342,031

LAND CULTIVATING APPARATUS

John Peter Bagan, Portland, Oreg., assignor of one-third to Anthony R. Wanezek, Marshfield, Oreg.

Application May 28, 1941, Serial No. 395,635

3 Claims. (Cl. 97—41)

The principal object of my invention is to provide a helical blade implement or so called spiral blade plow which is inexpensive to construct, effective in its operation, light in weight, and flexible in its operation so that it may be used for all general and many special types of ground cultivation. This application is a continuation in part of my co-pending application for patent entitled Rotary spiral plows, filed November 19, 1940, Serial No. 366,278.

It is desirable to provide a helical blade cultivating implement of this character which is light in weight so that it may be conveniently used with any type of tractor. The helical or spiral blade is power driven and because of its shape tends to dig into the ground and to supplement the pull of the tractor to which it is attached in moving across the field rather than to provide a draft load therefor. Such a device does not depend upon its mass to force the cutting blade into the ground, but on the other hand, the shape of the blade itself serves to force the blade into the ground and to move the entire device forward by its cutting action. Such type of device develops one serious disadvantage, however, and that is that it tends to become shifted laterally when said helical blade digs into the ground and cuts up the pieces of dirt thus removed. It has been believed necessary that said device must be massive thus to resist said lateral shifting action. I have been able to overcome this defect in a light-weight device by arranging the axes of the load supporting wheels in the same general vertical transverse plane as the one in which the axis of rotation of the spiral blade lies. Thus there is no tendency of said cultivator to cant or to move out of a straight line. I supplement said arrangement by providing two flat disk-type colters fore and aft of said transverse plane which colters can be set to dig into the uncut ground in front of and may extend to the unplowed ground beneath the prepared seed bed to the rear of said plane. Said two colters thus arranged effectively resist said lateral movement even tho the implement is extremely light and is not provided with any lateral braces to the tractor or other device operatively engaged with said implement.

A further and more specific object of my invention is to provide an implement of this character which may be used either for general plowing or for cultivating in an orchard or in other places where it is necessary to move up to growing trees, fences or the like without injuring the latter. I attain this object by providing a device of this character with a wheel mounting adapted to be arranged on that side of the plow which rests on the uncultivated soil with a crank-type wheel support which may be swung inwardly of the outer edge of the frame at that side of the implement for cultivation work or may be arranged in the transverse plane of the axis of rotation of the cutter if clearance does not present a problem. In connection with said structure, I make the frame of an implement embodying my invention with removable pieces so that a three-foot heavy duty plowing cutter can be supported thereby or a relatively long and shallower cutting cultivating spiral cutter may be accommodated interchangeably wtihout great difficulty.

A further object of my invention is to provide a machine of this character which may be speeded up to chop the ground quite fine with a helical cutter and yet the dirt thus cut may be so controlled as to leave a flat surface rearwardly of the cutter and the lateral shift produced by said spiral cutter may be compensated for and the dirt removed by the helical cutter may be returned to the lateral position from which it was originally removed. I attain this object by providing a pendant shield of substantial weight with oblique baffles or guides on the inner surface facing the cutter. The dirt is thrown by the spiral or helical cutter rearwardly against said shield which levels the cultivated ground and the baffles lead the dirt thus thrown against the shield laterally to the position it assumed before it was cut by the spiral or helical cutting element.

Further and other details of my invention are hereinafter described with reference to the accompanying drawings, in which:

Fig. 3 is a longitudinal section taken on the line 3—3 in Fig. 1 illustrating the manner in which the spiral cutter element breaks up the ground and throws it rearwardly against a pendant shield, which shield directs said cultivated earth rearwardly and levels it off;

Fig. 4 is a transverse sectional view taken on the line 4—4 in Fig. 2 illustrating the manner in which ground may be cultivated, said figure also showing details of construction of an implement embodying my invention;

Fig. 5 is a detail view taken on the line 5—5 in Fig. 6;

Fig. 6 is an elevation of one of the load supporting wheels of my device shown broken away to disclose details of construction;

Figure 1:
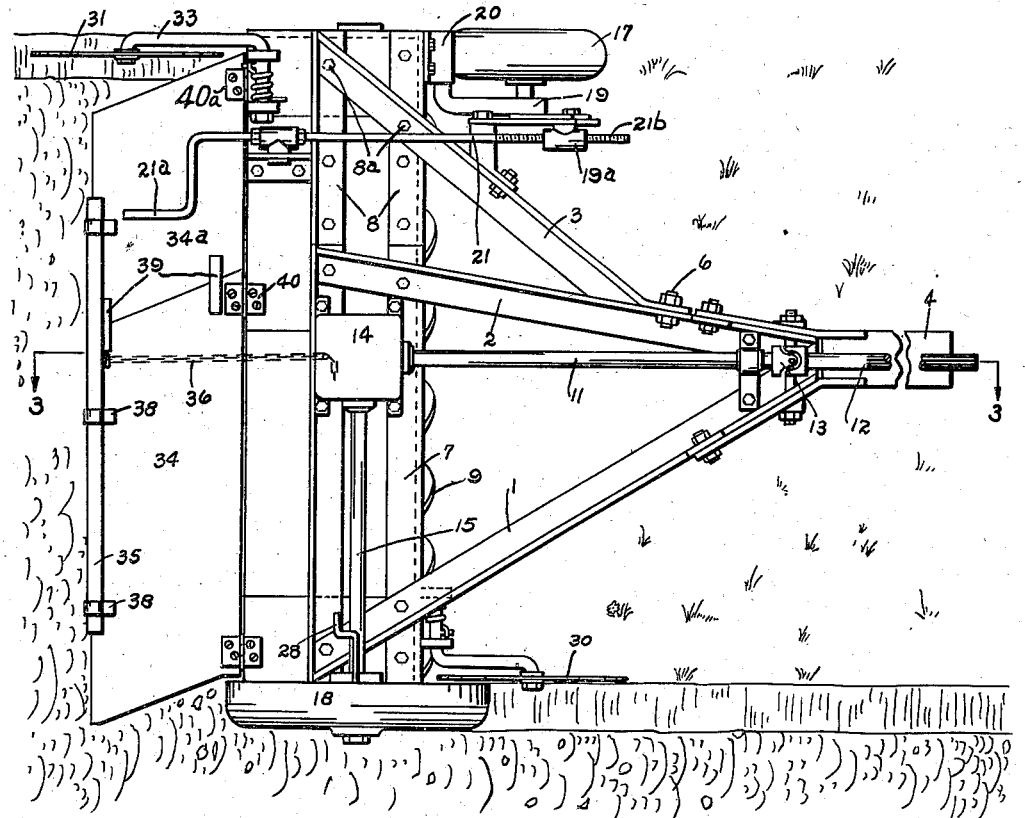
Fig. 1 is a plan view of a cultivating implement embodying my invention in which view is diagrammatically illustrated the manner in which said spiral cultivator functions.
Figure 7:
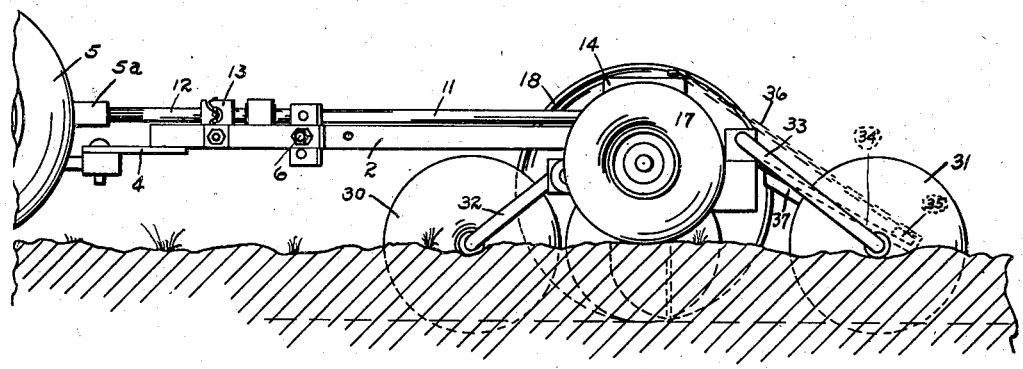
Fig. 7 is a side elevation of a land cultivating implement embodying my invention taken in the direction of the arrow 7 in Fig. 2 and illustrates the manner in which colters are arranged forward and aft of the spiral cutting element to prevent lateral shifting or canting thereof.
Figure 8:
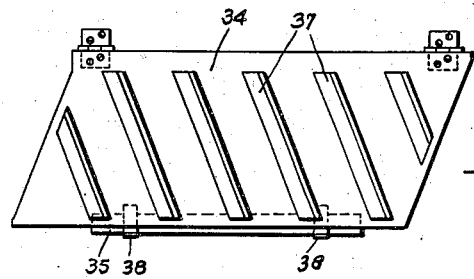
Fig. 8 is a view looking towards the inner face of the shield portion of my invention showing the obliquely arranged baffles for shifting the cultivated dirt laterally to return it to the same lateral position it assumed before it was acted upon by the spiral cutter of my invention.

A ground tilling implement embodying my invention comprises a machine having a frame preferably constructed of structural elements 1, 2 and 3 extending more or less longitudinally of said machine to define a draw bar connection. Elements 1 and 2 form virtually an A-frame to which a tongue 4 is secured. Said tongue is adapted to be secured to the rear end of a tractor 5, a small portion of which is shown in Fig. 7. The member 3 is bolted to member 2 by bolt 6 so as to be disengageable therefrom. A bolster 7 is secured to one end of each of said structural elements and when structural element 3 is provided, as is shown in Fig. 1, a removable section 8 is provided for the bolster and one end of said member 3 is bolted thereto by bolts 8a.

Figure 2:
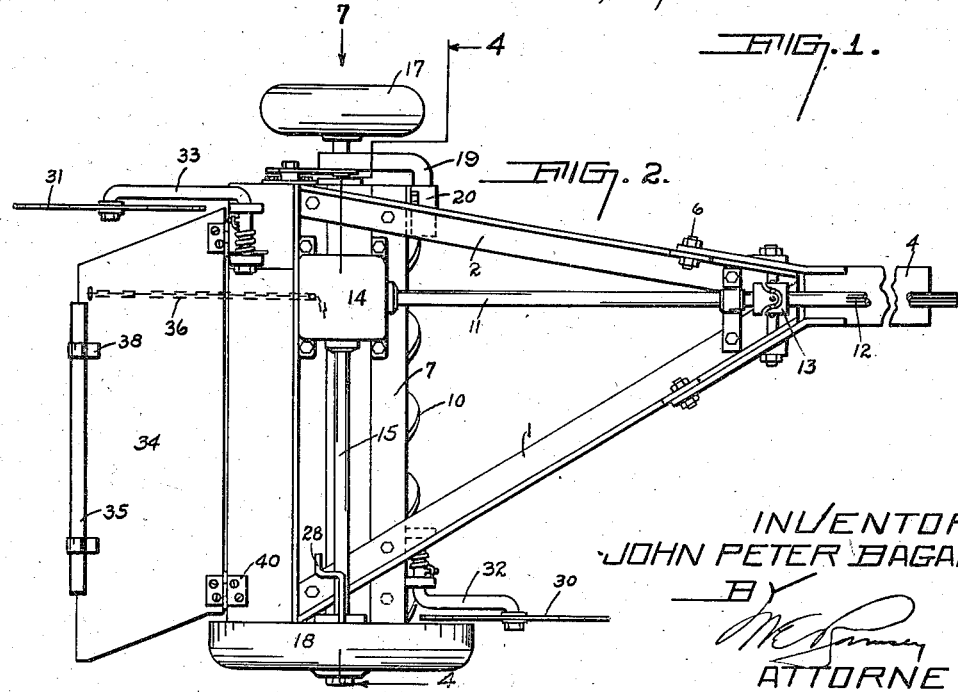
Fig. 2 is a plan view of said cultivating implement shortened in over-all width by removal of a section of the frame so as to be useable as a heavy-duty plowing implement for general use.

When said removable section is inserted in the bolster, a relatively long helical blade 9 may be provided for relatively shallow cultivating work. When it is desired to use said implement for heavy plowing, for example, it is desirable that a shorter helical blade 10 be provided, as is illustrated in Fig. 2. For example, a small general utility tractor may be used to pull a three-foot plow type helical cutter or may be used to pull a five-foot helical cutter for general cultivation work. Power for said cutter blade is provided by a shaft 11 connected to spline shaft 12 thru universal joint 13. Said spline shaft is adapted to connect with power take-off connection 5a of tractor 5. A power transmission element 14 joins shaft 11 to a transverse shaft 15. A helical blade 10 is joined to shaft 15, as is shown in Fig. 4, by a chain 16 mounted over sprockets on the ends of the transverse shaft 15 and the shaft 10a of said helical blade. Said helical blade 10 is journalled beneath the bolster 7, as is shown in Fig. 4, and said bolster is supported at its ends by a rubber tired wheel 17 at one side and by a dished metallic wheel 18 on the other side. Of course, the types of wheels shown are merely for the purpose of illustration and any convenient type of wheel may be used, as would suggest itself to a person skilled in the art.

The wheel 17 is carried upon a bell-crank mounting 19 pivotally supported at one end of the bolster in a bearing cap 20. Said bell-crank may be swung about the axis of the bearing cap by a crank 21 screw threaded in a sleeve 19a on said bell-crank mounting 19. Said crank has an off-set handle 21a for this purpose. As is shown in Fig. 1, as said bell-crank 21 is rotated by said handle, it will pull the sleeve toward the handle or force it away therefrom by the threaded section 21b, said crank engaging the tapped interior of the sleeve 19a, thus to raise or lower the said wheel 17 with respect to the axis of rotation of the spiral cutter or helical blade 9.

The dished metallic wheel 18 may be adjusted in the manner indicated in Figs. 4, 5 and 6. A trunnion 22 extends laterally from a block 23, slidably engaged by clips 24 secured to a face plate 25, bolted to bolster 7 by bolts 29. Said block has a lateral flange 23a formed thereon which is tapped and is in operative engagement with the threaded stem of a feed screw 26. Said feed screw is journalled in a bearing 27 secured to said face plate 25. A handle 28 extends laterally from said wheel, as is shown in Fig. 4, and carries a miter gear 28a which is in engagement with miter gear 26a on the feed screw 26. As handle 28 is rotated it correspondingly rotates feed screw 26 to lower or raise blocks 23 on face plate 25 and to correspondingly lift or lower the axis of rotation of the wheel 18 with respect to the axis of rotation of the helical blade 10.

I have determined from experimenting with this soil tilling implement that a cultivator five feet wide requires about as much power as a plow three feet wide and this is the reason for the necessity of a removable section so that a user of a land tilling implement embodying my invention may utilize a common frame and driving mechanism and either of two helical blades, one a shorter blade for general plowing and work in an open field or a longer cultivating blade for work in an orchard, for example. When a longer blade is used and it is desired to use a machine embodying my invention in an orchard, it is necessary that the tired wheel 17 be moved inwardly so that the outer edge of the helical blade 9 thereon may cultivate ground the full distance to the edge of the bolster on which said tired wheel 17 is secured. The wheel, its bell-crank mounting and the adjustable devices are then arranged as is shown in Fig. 1. When said removable section is removed and it is desired to provide a machine for plowing, it is preferable that the tired wheel be arranged so that its axis of rotation lies substantially in the same vertical transverse plane as that in which the axes of rotation of the spiral cutter 10 and the dished metallic wheel 18 lie in the manner shown in Fig. 2.

The helical blades 9 and 10 tend to dig up the dirt and lift it laterally because of the formation of the helical blade. The lateral movement of the dirt tends to push the implement sideways and this must be resisted. If the wheels are arranged in different lateral planes, said lateral push produced by said helical cutters tends to cant or twist the implement about a vertical axis. To resist said canting and to prevent the lateral movement of said implement by the action of the helical blade, I preferably provide two colters 30 and 31 forward and aft of the axis of rotation of the helical blade on said implement. Said colters preferably lie equal distances forward and aft of said cutter, as is shown most clearly in Fig. 7. Said colters are preferably plane disks and are journalled on offset cranks 32 and 33, respectively. Said colters preferably resiliently are held to a position as is shown in Fig. 7, so that said colter 30 engages unplowed land beneath the seed bed and colter 31 engages deeply the unplowed land at the side of the plowed land rearwardly of rubber tired wheel 17. If said colters are thus arranged and are spaced equal distances, more or less, forward and aft of the axis of rotation of the helical blade of an implement embodying my invention, said implement will run in a straight line and will not be shifted laterally or will not cant about a vertical axis.

As far as I know, it has been the accepted theory that spiral cultivators must be made quite heavy to resist the lateral shifting and canting, but I have determined that a device can be made of light structural members such as I have illustrated and such lateral movement or twisting can be effectively prevented by said colters such as are illustrated and described and I deem this an important feature of my invention.

I preferably operate said helical cutters so that they rotate substantially faster than the wheels 17 and 18 and thus the rotation of said cutter tends to force the implement forwardly and thus there is no draft load on the tongue 4 and actually the soil cultivator tends to push the tractor forward and thus the tractor must be selected only to provide sufficient power for driving said helical blade. When the peripheral speed of said helical cutter exceeds the peripheral speed of the load carrying wheels, however, it tends to throw the cultivated soil upwardly and also to throw it laterally and thus would tend to produce an uneven replacement of soil in the cultivated ground. I provide a smooth surface for said cultivated ground by arranging a shield 34 in an oblique manner, as is shown in Fig. 3, more or less pendent behind the helical cutter. Said shield is massive and heavy and I preferably add a removable weight 35 on said shield to hold it in position and to smooth out the ground behind the helical cutter. The vertical height of the free end of said shield may be regulated by a chain 36 which supports said shield. The lateral displacement of dirt can be corrected by providing oblique laterally inclined baffles 37 upon the inner face of the shield, that is, the face of the shield which faces the cutter. Said baffles are inclined to a degree substantially equal to the pitch of the helical cutter and thus dirt which is thrown laterally by the latter will strike the baffles 37 and be directed downwardly and laterally to the line from which the dirt was originally removed. Said baffles preferably are made of angle iron sections which are secured to the inner face of the shield by one flange and the other flange is outstanding from said shield to provide a sufficient area for directing and shifting said dirt laterally of said shield, as has been described.

The weight 35 is removable from the shield and thus a weight of proper mass may be lodged in the clips 38 on said shield to hold the free end of the latter down but without imposing undue drag to impede the forward progress of said land tilling implement. The shield 34 is also provided with a removable section 34a which may be added when a longer helical blade is provided, as is indicated in Fig. 1. Said removable section 34a is held to the remainder by latching bars 39 which extend across the joint between shield 34 and the removable section 34a and grip the edge of shield 34. Said shield is pivotally secured to the bolster by hinge members 40 and section 34a is secured to said bolster by a hinge member 40a as is shown in Fig. 1.

Figure 9:
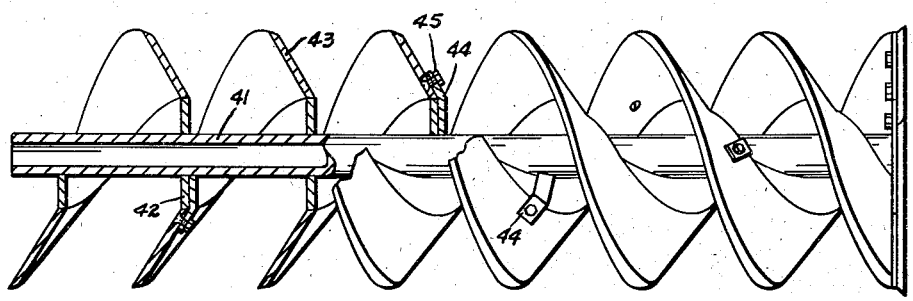
Fig. 9 is an elevation of a spiral cutter used in my invention, shown partly in section to disclose details of construction thereof.
Figure 10:
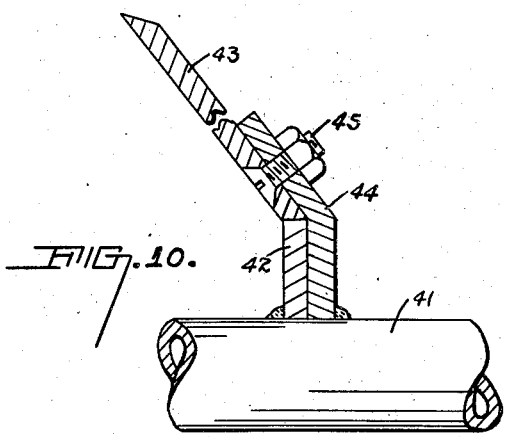
Fig. 10 is a detail view showing the manner in which said spiral cutter is constructed.

In Figs. 9 and 10, I illustrate a helical blade particularly adapted for my invention. This type of helical cutter blade was described in detail in my application for patent entitled Spiral cutters, filed April 27, 1940, Serial No. 332,121, which was copending with my application entitled "Rotary spiral plows," filed April 29, 1940, Serial No. 332,220, which in turn is copending with the present application. Suffice it to say that a cutter of this character comprises a hollow shaft 41 having welded or otherwise secured thereto, a right helicoid base member 42 and an oblique helicoid cutter element joined to said base member by clips 44, for example. Said oblique helicoid cutter element may thus be removed from the base element by removing bolts 45 to separate the cutter element from the base element and from said clips. Said clips and said base member preferably are welded to the shaft, as is shown in Fig. 10. This is for the reason that the cutter element wears and requires replacement while the base member and the clips will last substantially as long as the remainder of the implement.

I claim:

1. In a land tilling implement, comprising a frame including a transverse bolster, a helical ground working element journalled transversely of said frame and beneath said bolster and power transmitting mechanism supported by said frame and operatively joined to said ground working element, the combination therewith of a pendant massive shield trailing rearwardly of said ground working element and means for varying the vertical height of the trailing edge thereof with respect to that of the axis of rotation of said ground working element, and obliquely disposed laterally inclined baffle elements carried by said shield and facing said ground working element.

2. In a land tilling implement, comprising a frame including a transverse bolster, a helical ground working element journalled transversely of said frame and beneath said bolster and power transmitting mechanism supported by said frame and operatively joined to said ground working element, the combination therewith of a pendant massive shield trailing rearwardly of said ground working element and means for varying the vertical height of the trailing edge thereof with respect to that of the axis of rotation of said ground working element, and obliquely disposed laterally inclined baffle elements carried by said shield and facing said ground working element, the inclination of said baffle elements corresponding generally but opposed to the pitch of said helical ground working elements to redistribute the earth removed by said ground working element in tilling soil.

3. In a land tilling implement, comprising a frame including longitudinally extending members constituting a draw bar connection and a transverse bolster, a helical ground working element journalled transversely of said frame and beneath said bolster and power transmitting mechanism supported by said frame and operatively joined to said ground working element, the combination therewith of a removable section for said bolster, a removable obliquely disposed frame member adapted to be joined to one end of said bolster, a bell-crank wheel mounting, a journalled bearing therefor, means for securing said bearing to the end of the front side of said removable section or in reverse position to the end of the front side of said bolster, and means for securing said wheel mounting to said removable frame member or to the end of said bolster whereby said wheel may be supported either inwardly of the end of said removable section or outwardly of the end of said bolster.

JOHN PETER BAGAN.